United States Patent
Roup et al.

(10) Patent No.: US 10,220,601 B2
(45) Date of Patent: Mar. 5, 2019

(54) MULTI-FEED SYSTEM

(71) Applicant: Talon Technologies, Inc., Woodland Hills, CA (US)

(72) Inventors: Herman Sydney Roup, Santa Barbara, CA (US); Seymour Lennox Adlam, Fort Worth, TX (US)

(73) Assignee: TALON TECHNOLOGIES, INC., Woodland Hills, CA (US)

( * ) Notice: Subject to any disclaimer, the term of this patent is extended or adjusted under 35 U.S.C. 154(b) by 227 days.

(21) Appl. No.: 15/422,439

(22) Filed: Feb. 1, 2017

(65) Prior Publication Data

US 2017/0253016 A1   Sep. 7, 2017

Related U.S. Application Data

(60) Provisional application No. 62/301,808, filed on Mar. 1, 2016.

(51) Int. Cl.
  *A41B 3/00* (2006.01)
  *A41F 9/00* (2006.01)
  (Continued)

(52) U.S. Cl.
  CPC .............. *B32B 37/10* (2013.01); *A41B 3/005* (2013.01); *B32B 5/02* (2013.01); *B32B 37/06* (2013.01);
  (Continued)

(58) Field of Classification Search
  CPC ........... A41H 43/04; A41B 3/005; A41F 9/00; Y10T 156/1741; B32B 37/203; B29C 66/83411
  See application file for complete search history.

(56) References Cited

U.S. PATENT DOCUMENTS 2,319,809 A   5/1943   Francis, Jr.
2,573,773 A   11/1951  Rowe
(Continued)

FOREIGN PATENT DOCUMENTS

EP   0945535   9/1999
GB   1408777   10/1975
(Continued)

OTHER PUBLICATIONS

WIPO, PCT/US2014/057890, International Preliminary Report on Patentability Chapter I, dated Sep. 4, 2018 (6p.).
(Continued)

*Primary Examiner* — Carson Gross
(74) *Attorney, Agent, or Firm* — Siritzky Law, PLLC

(57) ABSTRACT

A method and system for creating a continuous stream of elements of garments. With a multi-line fusing press: simultaneously and continuously, for each line of a plurality of lines, each line having a corresponding blower, a corresponding guide, and a corresponding feeder: passing a first substrate under the corresponding blower for the line and into the corresponding guide for the line; feeding, using the corresponding feeder for the line, a continuous fusible substrate into the corresponding guide for the line to position the fusible substrate above the first substrate; feeding, via the corresponding guide for the line and into the multi-line fusing press, a combination of the fusible substrate and the first substrate, the fusible substrate positioned above the first substrate; and the multi-line fusing press pressing the combination of the fusible substrate positioned above the continuous first substrate. The first substrate may be compacted by a multi-line compactor.

30 Claims, 4 Drawing Sheets

(51) Int. Cl.
  *B32B 5/02* (2006.01)
  *A41H 43/04* (2006.01)
  *B29C 65/00* (2006.01)
  *B32B 37/06* (2006.01)
  *B32B 37/10* (2006.01)
  *B32B 37/14* (2006.01)
  *B32B 37/20* (2006.01)

(52) U.S. Cl.
  CPC ............ *B32B 37/14* (2013.01); *B32B 37/203* (2013.01); *A41F 9/00* (2013.01); *A41H 43/04* (2013.01); *B29C 66/83411* (2013.01); *B32B 2309/02* (2013.01); *B32B 2309/12* (2013.01); *B32B 2309/14* (2013.01); *B32B 2317/10* (2013.01); *B32B 2437/00* (2013.01); *Y10T 156/1741* (2015.01)

(56) References Cited

U.S. PATENT DOCUMENTS

| | | |
|---|---|---|
| 3,100,925 A | 8/1963 | Hubert |
| 3,290,209 A | 12/1966 | Ihrman |
| 3,382,552 A | 5/1968 | Davis et al. |
| 3,504,712 A | 4/1970 | Dusenbury et al. |
| 3,562,817 A | 2/1971 | Huddelston |
| 3,570,085 A | 3/1971 | Heinemann |
| 3,589,030 A | 6/1971 | Troope |
| 3,655,474 A | 4/1972 | Constantine |
| 3,723,217 A | 3/1973 | Bauer |
| 3,723,993 A | 4/1973 | Ruby |
| 3,822,335 A | 7/1974 | Cohen |
| 3,867,248 A | 2/1975 | Bauer |
| 4,007,835 A | 2/1977 | Klothe |
| 4,033,783 A | 7/1977 | Groome et al. |
| 4,051,215 A | 9/1977 | Tsuruta et al. |
| 4,357,197 A | 11/1982 | Wilson |
| 4,585,510 A * | 4/1986 | Hadjiskakis .......... A41H 43/04 156/555 |
| 5,987,721 A | 11/1999 | Morris |
| 9,840,037 B2 | 12/2017 | Roup |
| 2004/0019955 A1 | 2/2004 | Morris et al. |

FOREIGN PATENT DOCUMENTS

| | | |
|---|---|---|
| GB | 1445391 | 8/1976 |
| GB | 1 574 661 A | 9/1980 |
| WO | WO1997030205 A1 | 8/1997 |
| WO | WO/2015/065630 | 5/2015 |

OTHER PUBLICATIONS

WIPO, PCT/US2014/057890, Written Opinion of the International Search Authority, dated May 18, 2017 (5p.).

WIPO, PCT/US2014/057890, International Search Report, dated May 18, 2017 (3p).

Chinese Patent Office (State Intellectual Property Office for People's Republic of China), First Office Action, dated May 27, 2017 for Chinese Patent Application No. CN 201480059583.3 (Chinese with English translation).

Chinese Patent Office (State Intellectual Property Office for People's Republic of China), Search Report, dated May 27, 2017 for Chinese Patent Application No. CN 201480059583.3 (Chinese with English translation).

EPO Extended Search Report for EP 14 858 495.6, dated Oct. 4, 2016 [6 pgs.].

WIPO, PCT/US14/57890, International Search Report, dated Jan. 2, 2015.

WIPO, PCT/US14/57890, Written Opinion of the International Searching Authority, dated Jan. 2, 2015.

\* cited by examiner

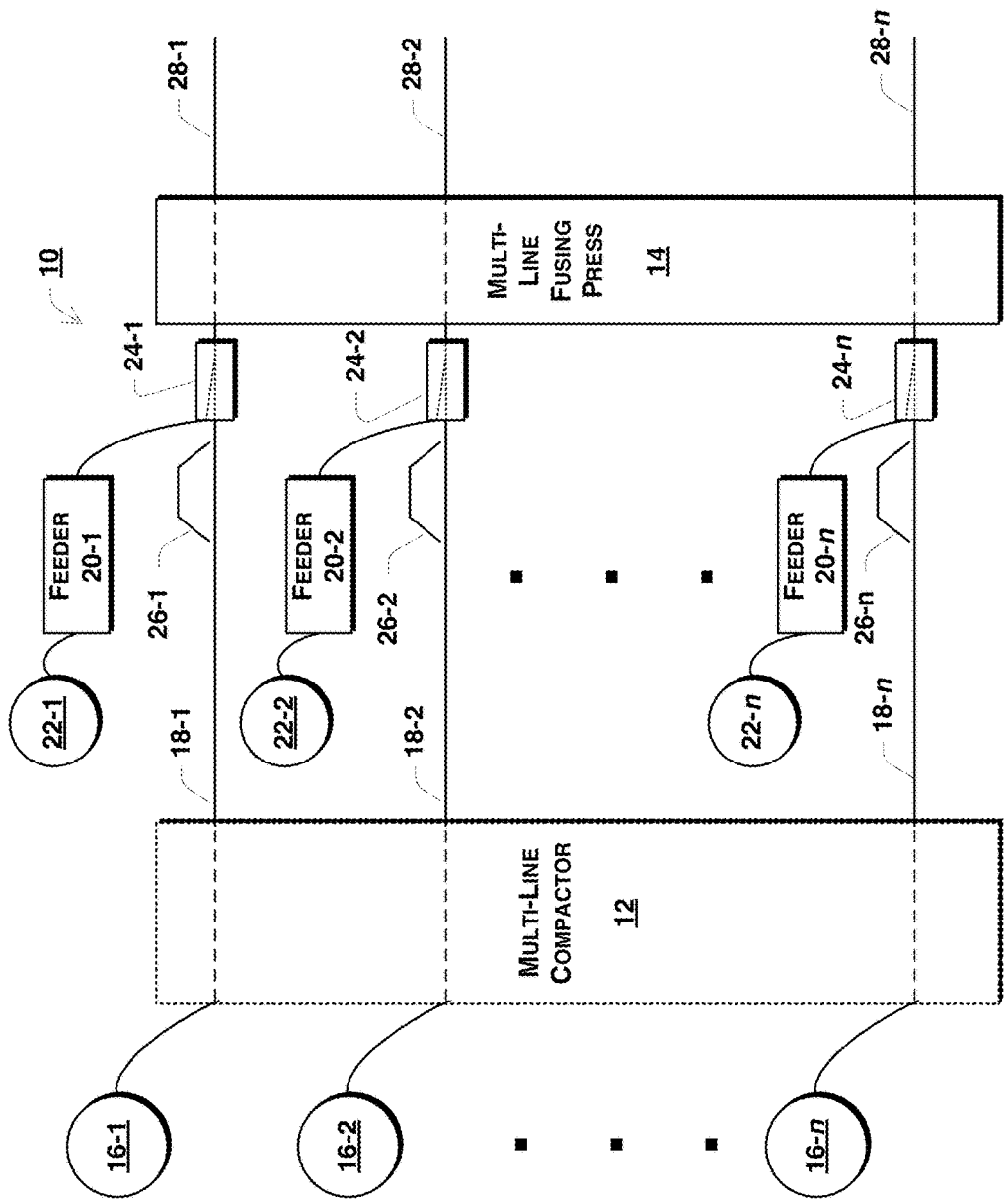

MULTI-FEED SYSTEM

RELATED APPLICATIONS

This application is related to and claims priority from U.S. Provisional Patent Application No. 62/301,808, filed Mar. 1, 2016, the entire contents of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

BACKGROUND OF THE INVENTION

Field of the Invention

This invention relates to garment and garment manufacture, and, more particularly to methods and devices for garment manufacture.

Background and Overview

FIGS. 1A-1B depict conventional feed systems used to join a so-called "self" fabric with a fusible material or substrate. As shown in FIG. 1A, in one conventional feed system, the self-fabric and a fusible substrate are fed into a fusing press (or fuser) and a joined or fused fabric is formed. The fabric may be used to make parts of garments, such as waistbands or collars or the like. The term "fusible" (as a noun) is sometimes used herein to refer to the fusible material or substrate. As shown in FIG. 1B, in some conventional feed systems, the self-fabric is fed into a compactor, which produces, as output, a compacted self-fabric. The compacted self-fabric and a fusible substrate are then fed into a fusing press (or fuser) and a joined or fused fabric is formed.

Sticking in the feeding box causes tension and may cause the self-fabric to buckle or pucker.

In the conventional feed systems shown in FIGS. 1A-1B, the fusible substrate is typically pulled out of a box and may be coated in a powder to prevent sticking to parts of the fusing press, but the powder may also cause jamming Even if not coated with a powder, adhesives in the fusible may stick or melt together, for example, if the product is left in containers for long periods of time.

Tension on the fusible substrate may cause problems during the feeding process to the fusing press. Sticking and tension problems result in the feed system having to be shut down.

When the compacted self-fabric exits the compactor, it may be frayed along its side edges. In addition, loose pieces of thread from the fabric may be present on the self-fabric. The frayed edges may overlap or fold onto the fabric and will be fully or partially covered by the fusible during the fusing process. FIG. 2A shows an example compacted self-fabric on exit from the compactor. As can be seen in the drawings, threads from the edges of the fabric as well as loose threads may cover the fabric. As shown in FIG. 2B, when the fusible substrate is laid over the self-fabric, the threads may be covered. After the fusing process these threads that are covered by the fusible may be visible through the fabric, thereby making portions of the joined fabric unusable. Often these defects are not noticed until the joined fabric is incorporated into a garment, thereby making the entire garment defective or of inferior quality.

It is desirable and an object of the present invention to have an efficient feed system. In addition, it is desirable and an object of the present invention to have a feed system that avoids the problems of threads and the like being under the fusible and contaminating the joined fabric.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 3 depicts aspects of a multi-line feed system according to exemplary embodiments hereof;

DETAILED DESCRIPTION OF THE PRESENTLY PREFERRED EXEMPLARY EMBODIMENTS

Figure 1A:
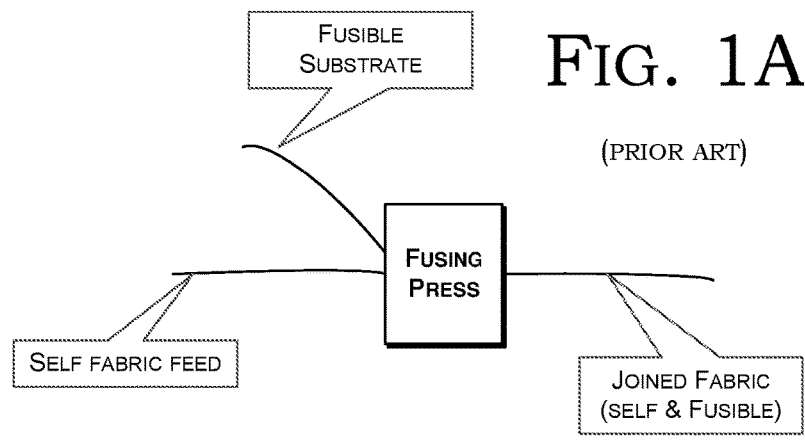
FIGS. 1A-1B depict conventional feed systems.
Figure 1B:
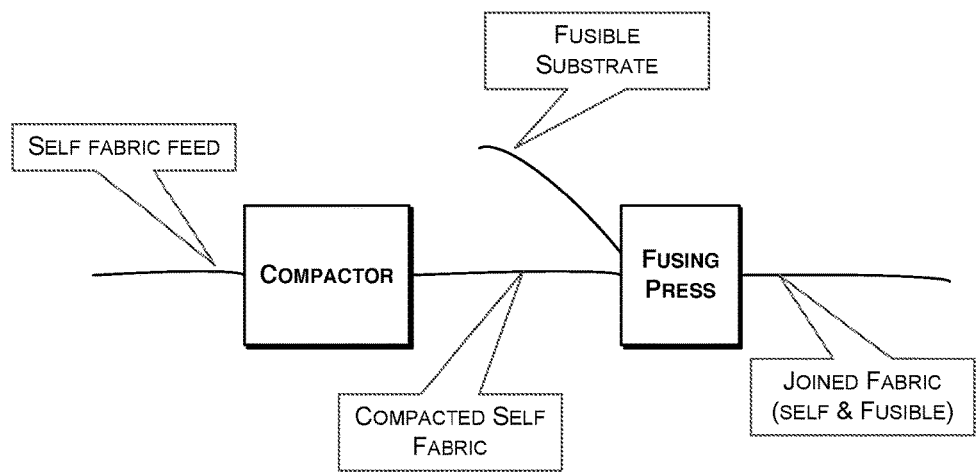
Figure 2A:
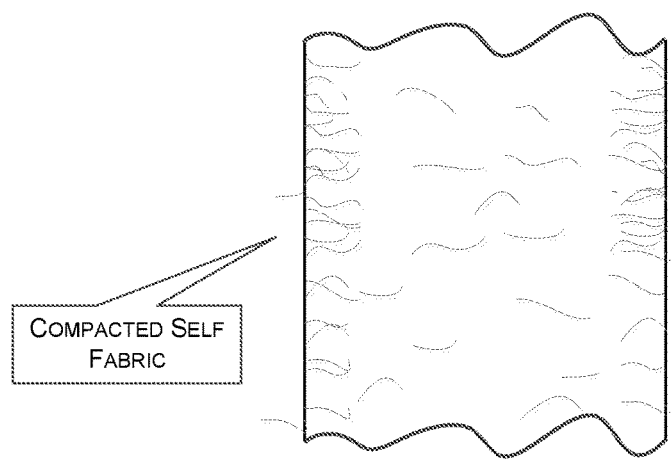
FIGS. 2A-2B show aspects self-fabric and fusible substrate in the conventional feed system of FIGS. 1A-1B.
Figure 2B:
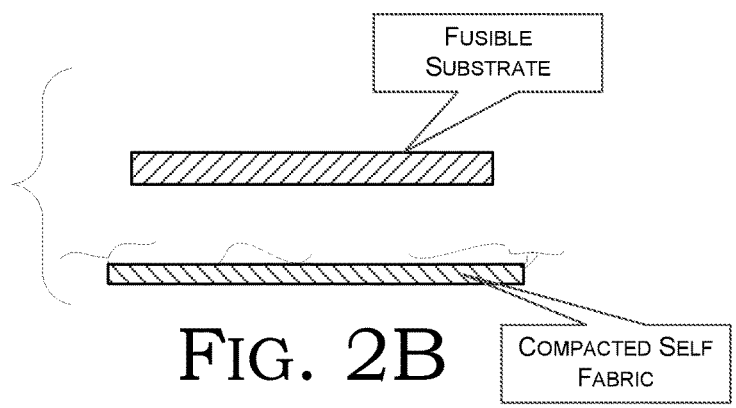

FIG. 3 depicts aspects of a multi-line feed system 10 according to exemplary embodiments hereof. As used herein, the term "multi" refers to two or more, and so, e.g., the "multi-line" refers to two-or more lines. As shown in FIG. 3, the feed system 10 includes a multi-line compactor 12 and a multi-line fusing press 14, each of which can support multiple (i.e., 2 or more) feeds.

Multiple self-fabric feeds 16-1, 16-2, . . . 16-n (collectively self-fabric feeds 16) are positioned to feed self-fabric into the multi-line compactor 12. In a feed system with n lines or feeds, the j-th feed, is referred to as feed 16-j, for j=1 to n. So, e.g., the first feed is feed 16-1, and so on. For each self-fabric feed 16-j (for j=1 to n, where n is the number of lines or feeds), the corresponding compacted self-fabric is referred to as fabric 18-j. Some embodiments do not include the multi-line compactor 12, and the fabric 18-j corresponds to the self-fabric 16-j without compaction (for j=1 to n).

Although any number of self-fabric feeds 16 may be used, in a presently preferred embodiment eight (8) self-fabric feeds are used.

Corresponding to each self-fabric feed 16-j is a feeder mechanism 20-j that feeds an appropriate corresponding fusible 22-j into the multi-line fusing press 12 via a corresponding guide 24-j. The guide 24-j aligns the fusible 22-j, output from the feeder 20-j, with the corresponding compacted self-fabric 18-j. The aligned fusible 22-j and compacted self-fabric 18-j are fed into the multi-line fusing press 14.

Although a gap is shown between the guides (24-1, 24-2, etc.) and the multi-line press 14 in FIG. 3, in some embodiments there may be no gap between the guides (24-1, 24-2, etc.) and the multi-line press 14. In some cases the guides (24-1, 24-2, etc.) may be incorporated into the multi-line press 14.

The fusible 22-j is preferably the same width as the self-fabric 18-j so that, when aligned by the guide 24-j, the fusible 22-j substantially covers the self-fabric 18-j. In some cases it may be acceptable for the fusible to be slightly narrower than the self-fabric, so that an edge portion of the self-fabric of about 1/16 to 1/8 of an inch remains uncovered by the fusible.

The fusible 22-*j* may be spooled or fed from a box into the feeding system 20-*j*.

A blowing mechanism 26-*j* (described in greater detail below) is positioned substantially over the compacted self-fabric 18-*j* prior to the compacted self-fabric 18-*j* being fed into the guide 24-*j*.

The multi-line fusing press 14 fuses together the each of the pairs of compacted self-fabric 18-*j* and corresponding fusible substrates 22-*j* under conditions (e.g., at temperature, pressure, and speed) appropriate for the materials being used. Those of ordinary skill in the art will know and understand what settings to use for the fusing press 14 based on the materials being used for the self-fabric 18-*j* and corresponding fusible substrates 22-*j*. The output of the fusing press 14 for each input line is a fused combination of the compacted self-fabric 18-*j* and corresponding fusible substrates 22-*j*. Thus, the output of the fusing press 14 comprises multiple lines of fused combinations of the compacted self-fabric 18-*j* and corresponding fusible substrates 22-*j* (for j=1 to n).

Those of ordinary skill in the art will realize and appreciate, upon reading this description, that each line preferably uses the same self-fabric and the same fusible. That is, the input self-fabric 18-*j* is preferably the same type of fabric for each line (j=1 to n). Similarly, the fusible substrates 22-*j* should each be the same type of fusible (for j=1 to n). Different fabrics and fusible substrates may be combined on the same multi-line system, as long as they can go through the system at the same speed, temperature, and pressure. The fabric and fusibles for the different lines need not be of the same width.

The output from the multi-line fusing press 14 comprises multiple lines of fused fabric 28-*j* (compacted self-fabric fused with fusible 22-*j*) (for j=1 to n). The fused fabric 28-*j* may be stored on spools or in boxes or fed into further mechanisms for subsequent processing.

Figure 4:
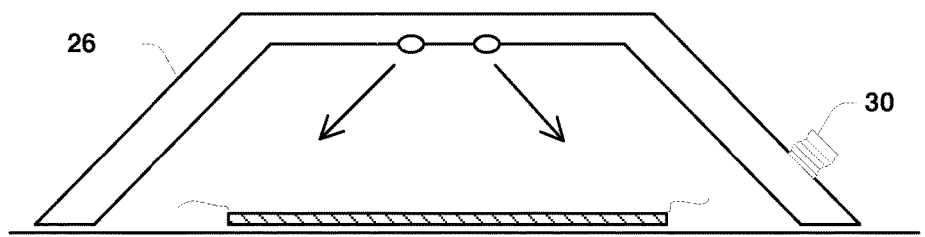
FIG. 4 depicts an air blowing device according to exemplary embodiments hereof.
Figure 5:
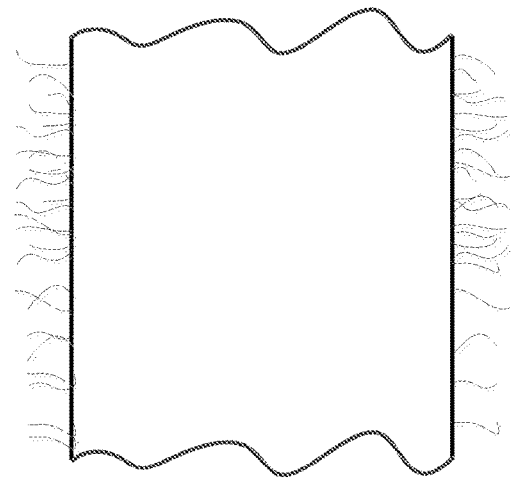
FIG. 5 shows the substrate after passing under a blowing mechanism according to exemplary embodiments hereof.

FIG. 4 shows a blowing mechanism 26 (corresponding to blowing mechanisms 26-*j* in FIG. 3) according to exemplary embodiments hereof. As shown in FIG. 4, the blowing mechanism 26 includes holes (e.g., two holes) positioned such that when the blowing mechanism 26 is positioned over a substrate (e.g., over compacted self-fabric 18-*j*), air blows through the holes at one or more angles in order to blow threads or like off the substrate. In some preferred embodiments the blowing mechanism 26 has two or more holes positioned to blow air at about 45 degree angles. An air input 30 may be used to feed air into the blowing mechanism 26. A source of air (not shown) may be connected to the air input 30 to provide a continuous source of air through the blowing mechanism 26. FIG. 5 shows the substrate (e.g., compacted self-fabric 18-*j*) after passing under the blowing mechanism 26, with the loose threads removed (blow off) and with the fringes blown off the edges.

The self-fabric 16-*j* (or first substrate) may be or comprise, without limitation, a material selected from the group comprising: denim, cotton (e.g., 100% cotton or cotton blends), wool (e.g. 100% wool or wool blends), polyester, polyester blends, spandex (elastane), spandex blend, polyester viscose (e.g., polyester and Rayon or some fabric made from regenerated cellulose fiber), linen or linen blends. A cotton blend may be, e.g., a 65/35 cotton polyester blend or a 50/50 cotton polyester blend. A polyester blend may be, e.g., a 98/2 polyester cotton blend or a 97/3 polyester cotton blend. Those of ordinary skill in the art will realize and appreciate, upon reading this description, that different and or other materials and blends may be used, and the examples of materials listed here are not intended to limit the scope of this invention in any way.

In operation, n feed lines are formed (n>1) by taking n spools of self-fabric and feeding each line of self-fabric into the multi-line compactor. The output from the multi-line compactor comprises n lines of compacted self-fabric. Each of the n lines of compacted self-fabric is passed under a corresponding blower mechanism and into a guide. For each of the n feed lines a corresponding source of fusible substrate is passed through a feeder mechanism and through a guide, overlaying a line of compacted self-fabric. The overlaid lines of fusible and compacted self-fabric are fed, via the guides, into the multi-line fuser.

EXAMPLES

Example 1

In one example, the self-fabric 16 is denim and the fusible substrate 22 is a 84 mm fusible substrate, and the multi-line fusing press 14 is set to about 180° C., speed at about 5 Meters/Minute and pressure at about 5 bars. In this example, 2 to 8 lines are processed.

Example 2

In another example, the self-fabric 16 is 100% cotton and the fusible substrate 22 is a 80 mm fusible substrate, and the fusing press 14 is set to about 160° C., at about 4 Meters/Minute with the pressure at about 4 bars. In this example, 2 to 8 lines are processed.

Example 3

In another example, the self-fabric 16 is denim and the fusible substrate 22 is a 47 mm fusible substrate, and the fusing press 14 is set to about 180° C., speed at about 5 Meters/Minute and pressure at about 5 bars. In this example, 2 to 8 lines are processed.

Example 4

In another example, the self-fabric 16 is 100% wool and the fusible substrate 22 is a 45 mm fusible substrate, and the fusing press 14 is set to about 160° C., speed at about 4 Meters/Minute and pressure at about 4 bars. In this example, 2 to 8 lines are processed.

Where a process is described herein, those of ordinary skill in the art will appreciate that the process may operate without any user intervention. In another embodiment, the process includes some human intervention (e.g., a step is performed by or with the assistance of a human).

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed:

1. A method for creating a continuous stream of elements of garments, the method comprising, with a multi-line fusing press:
   (A) simultaneously and continuously, for each line of a plurality of lines, each line having a corresponding blower, a corresponding guide, and a corresponding feeder:
      (A)(1) passing a first substrate under the corresponding blower for said line and into the corresponding guide for said line;
      (A)(2) feeding, using said corresponding feeder for said line, a continuous fusible substrate into said corresponding guide for said line to position said fusible substrate above said first substrate;
      (A)(3) feeding, via said corresponding guide for said line and into said multi-line fusing press, a combination of said fusible substrate and said first substrate, said fusible substrate positioned above said first substrate; and
      (A)(4) said multi-line fusing press pressing said combination of said fusible substrate positioned above said first substrate.

2. The method of claim 1 wherein said first substrate is a first compacted substrate.

3. The method of claim 2 wherein said first compacted substrate was compacted by a multi-line compactor operating with said multi-line fusing press.

4. The method of claim 3 wherein said multi-line compactor operates in synch with said multi-line fusing press, simultaneously and continuously compacting lines of said first substrate.

5. The method of claim 1 wherein said plurality of lines comprise two lines.

6. The method of claim 1 wherein said plurality of lines comprise three or more lines.

7. The method of claim 1 wherein said plurality of lines comprise between two and eight lines.

8. The method of claim 1 wherein the first substrate is denim.

9. The method of claim 8 wherein the multi-line fusing press is set to a temperature of about 180° C., a speed of about 5 Meters/Minute, and a pressure of about 5 bars.

10. The method of claim 1, wherein the first substrate is 100% cotton.

11. The method of claim 10 wherein the multi-line fusing press is set to a temperature of about 160° C., a speed of about 4 Meters/Minute, and a pressure of 4 bars.

12. The method of claim 1, wherein the first substrate is 100% wool.

13. The method of claim 12 wherein the multi-line fusing press is set to a temperature of about 160° C., a speed of about 4 Meters/Minute, and a pressure of 4 bars.

14. A method for creating a continuous stream of elements of garments, the method comprising, with a multi-line fusing press and a multi-line compactor:
   (A) simultaneously and continuously, for each line of a plurality of lines, each line having a corresponding blower, a corresponding guide, and a corresponding feeder:
      (A)(0) passing a first substrate through said multi-line compactor to produce a corresponding first compacted substrate;
      (A)(1) passing said first compacted substrate under the corresponding blower for said line and into the corresponding guide for said line;
      (A)(2) feeding, using said corresponding feeder for said line, a continuous fusible substrate into said corresponding guide for said line to position said fusible substrate above said first compacted substrate;
      (A)(3) feeding, via said corresponding guide for said line and into said multi-line fusing press, a combination of said fusible substrate and said first substrate, said fusible substrate positioned above said first compacted substrate; and
      (A)(4) said multi-line fusing press pressing said combination of said fusible substrate positioned above said first compacted substrate.

15. The method of claim 14 wherein said plurality of lines comprise two lines.

16. The method of claim 14 wherein said plurality of lines comprise three or more lines.

17. The method of claim 14, wherein the first substrate is denim.

18. The method of claim 17, wherein the multi-line fusing press is set to a temperature of about 180° C., a speed of about 5 Meters/Minute, and a pressure of about 5 bars.

19. The method of claim 14, wherein the first substrate is 100% cotton.

20. The method of claim 19, wherein the multi-line fusing press is set to a temperature of about 160° C., a speed of about 4 Meters/Minute, and a pressure of 4 bars.

21. The method of claim 14, wherein the first substrate is 100% wool.

22. The method of claim 21, wherein the multi-line fusing press is set to a temperature of about 160° C., a speed of about 4 Meters/Minute, and a pressure of 4 bars.

23. A system for creating a continuous stream of elements of garments, the system comprising,
   a multi-line fusing press; and
   a plurality of lines, each line having a corresponding blower, a corresponding guide, and a corresponding feeder,
   wherein, in operation, the system simultaneously and continuously, for each line of the plurality of lines:

(A)(1) passes a first substrate under the corresponding blower for said line and into the corresponding guide for said line;

(A)(2) feeds, using said corresponding feeder for said line, a continuous fusible substrate into said corresponding guide for said line to position said fusible substrate above said first substrate; and (A)(3) feeds, via said corresponding guide for said line and into said multi-line fusing press, a combination of said fusible substrate and said first substrate, said fusible substrate positioned above said first substrate; and wherein said multi-line fusing press simultaneously and continuously presses said combination of said fusible substrate positioned above said first substrate for each of said lines.

24. The system of claim 23 further comprising a multi-line compactor positioned to compact, simultaneously and continuously, said first substrate of each of said lines prior to passing said first substrate under said corresponding blowers for said lines.

25. The system of claim 23 wherein said plurality of lines comprise two lines.

26. The system of claim 23 wherein said plurality of lines comprise three or more lines.

27. The system of claim 23, wherein said first substrate is a first compacted substrate.

28. The system of claim 27, wherein said first compacted substrate was compacted by a multi-line compactor operating with said multi-line fusing press.

29. The system of claim 28, wherein said multi-line compactor operates in synch with said multi-line fusing press, simultaneously and continuously compacting lines of said first substrate.

30. The system of claim 23, wherein the multi-line fusing press is set to a temperature of between about 160° C. to 180° C., a speed of between about 4 to 5 Meters/Minute, and a pressure of between about 4 to 5 bars.

* * * * *